United States Patent

Storey, II et al.

[15] 3,672,046

[45] June 27, 1972

[54] METHOD OF MAKING AN ELECTRICAL COMPONENT

[72] Inventors: William T. Storey, II, West Chester; Robert F. Procter, Bristol; Charles H. A. Snyder, Philadelphia; George M. Jacob, Flourtown; Raymond T. Mooney, Philadelphia, all of Pa.

[73] Assignee: Technitrol, Inc., Philadelphia, Pa.

[22] Filed: Jan. 14, 1970

[21] Appl. No.: 2,742

[52] U.S. Cl. ....................................29/624, 174/52, 29/588, 29/627, 29/630 A

[51] Int. Cl. ....................................H01b 13/00, H05k 3/00

[58] Field of Search...........174/52; 29/624, 588, 627, 630 A, 29/628

[56] References Cited

UNITED STATES PATENTS 3,423,516 1/1969 Segerson....................................174/52

3,451,131 6/1969 Gruenstein ..............................29/624

3,484,536 12/1969 Jaeschke..................................174/52

3,489,952 1/1970 Hinchey...................................29/624

3,491,435 1/1970 Knau .......................................29/624

3,499,218 3/1970 Dahlgren .................................29/624

*Primary Examiner*—John F. Campbell

*Assistant Examiner*—Donald P. Rooney

*Attorney*—Yuter & Fields

[57] ABSTRACT

The method comprises forming a lead frame having a plurality of sets of leads and connecting at least one electrical element to each set of leads. The elements are preencapsulated with a pressure-distributing material which is substantially free of gases. The preencapsulated elements are then encapsulated and the respective elements and their associated leads are separated to provide the electrical components.

The invention further includes the electrical component per se.

12 Claims, 9 Drawing Figures

INVENTORS:
WILLIAM T. STOREY, II
ROBERT F. PROCTER
CHARLES H. A. SNYDER
GEORGE M. JACOB
RAYMOND T. MOONEY
BY Yuter + Fields
ATTORNEYS

INVENTOR.

BY

METHOD OF MAKING AN ELECTRICAL COMPONENT

This invention relates generally to an electrical component and a method of making the same and, more particularly, pertains to an article having an encapsulated ferrite element and the method of fabricating the same.

Presently, most so-called miniaturized components for use in electric circuits are insulated from ambient conditions by sealing the same in an epoxy resin or the like. Such encapsulation protects the sensitive electrical elements from moisture as well as physical and thermal shock. Additionally, encapsulation maintains the elements electrically insulated from its surroundings; the connections to such elements usually being made through leads extending through the encapsulating material. However, a problem arises when such encapsulation techniques are utilized for electrical elements composed of ferrite materials such as, for example, pulse transformers, memory cores, and the like.

To be more specific, electrical elements are usually encapsulated by a plastic resinous material in a transfer molding process. When the plastic material begins to cool and shrink stresses and strains arise. As a result unequal internal pressures are applied to the element embedded therein. Usually, these unequal pressures can be tolerated. However, ferrite elements are extremely sensitive to unequal pressures applied thereto and, in response thereto, their electrical characteristics change markedly. Thus, ferrite toroids which may have substantially identical inductances prior to such encapsulation processes may exhibit wide variations after being encapsulated. It is obvious, therefore, that encapsulation techniques of the type described produce ferrite components which are highly inaccurate and unreliable.

Accordingly, an object of the present invention is to provide an improved method of encapsulating an electrical element.

A further object of this invention is to provide a method which is specifically adapted to encapsulate ferrite elements so as to minimize changes in the characteristics of such elements.

Another object of the invention is the provision of a method for encapsulating ferrite elements which is suitable for mass production techniques.

Accordingly, the method of the present invention comprises forming a lead frame with a plurality of spaced sets of leads. At least one electrical element is connected to selected sets of leads and the elements are preencapsulated with a material which is free of gases and which substantially evenly distributes pressures applied thereto. The preencapsulated elements are then encapsulated and separated to provide the electrical components.

A feature of the invention is the provision of an electrical component fabricated in accordance with the above-described method which has substantially uniform characteristics.

Other features and advantages of the present invention will become more apparent from a consideration of the following detailed description when taken in conjunction with the accompanying drawings, in which.

Figures 1, 2:
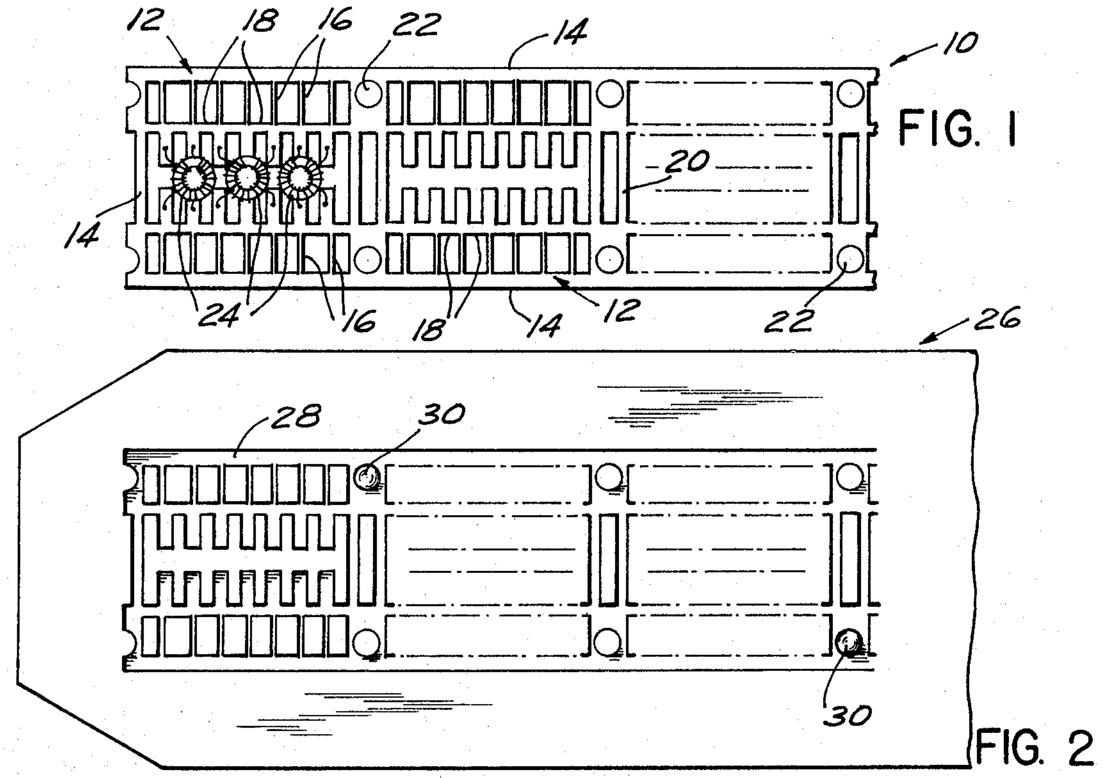
FIG. 1 is a top plan view of a portion of a lead frame formed in accordance with the present invention.
FIG. 2 is a top plan view of a portion of the bottom section of a preencapsulating mold.

A method practiced in accordance with the present invention comprises forming a lead frame 10 having multiple juxtaposed sets of leads 12. More specifically, the lead frame 10, which is fabricated from an electrically conductive material such as copper or the like, includes a lead mounting portion or edge 14 which extends about and forms the periphery of the frame 10. Extending inwardly from the opposed longitudinal edges 14 are the leads 16 which form each set 12. As shown in FIG. 1, opposed leads 16 terminate in spaced relation to each other. Laterally spaced tie bars 18 extend the length of the frame 10 and interconnect adjacent ones of the leads 16 to prevent run-off of the plastic material during encapsulation. In the example under consideration each set of leads 12 comprises seven pairs of leads 16 and each lead 16 is wider beyond the associated tie bar 18 to facilitate connection of an electrical element thereto. Additionally each set of the leads 12 is separated by a spacer bar 20 having locator holes 22 adjacent each end. It is to be noted that the particular configuration of the lead frame 10 is for illustrative purposes only and is not to be interpreted as being a limitation of the present invention. For example, the leads forming each set of leads may be more or less than the amount shown or the tie bars 18 may be eliminated.

As noted above, the method of the present invention is ideally suited to encapsulate ferrite electrical elements. Thus, for illustrative purposes the elements to be encapsulated will be assumed to be miniature transformers in the form of toroids having primary and secondary windings thereon and wherein the cores of such toroids are composed of a ferrite material.

More specifically, as shown in FIG. 1, three toroids 24 are provided for each set of leads 12. The four leads of the end toroid 24 are connected to the respective leads 16 forming the first two pairs of leads. The leads of the other end toroid are connected to the respective leads 16 forming the last two pairs of leads in the set 12. However, the intermediate toroid 24 is connected between the pairs of leads adjacent the end toroids 24; the middle pair of leads remaining unconnected. In practice, the toroid or transformer leads are connected to the associated leads 16 by soldering, welding or crimping the same together or the like and all the toroids on the frame 10 may be connected thereto either simultaneously or successively. Thus, each set of leads 12 will have three toroids or transformers 24 connected thereto.

The lead frame 10, with the toroids 24 connected thereto, are then placed within a mold so that the elements or toroids may be covered with a preencapsulation compound. The bottom section of the mold is shown in FIG. 2 and includes a metal lower mold half 26 which may be fabricated from aluminum or the like. Received on the upper surface of the lower mold half 26 is a cavity 28 which is formed in an inert substance such as silicon rubber or the like, which covers the entire upper surface of the mold half 26.

The cavity 28 is formed complementary to the lead frame 10 and the recessed portions thereof have a depth which is substantially equal to the height of the frame 10 (i.e., the width of the material forming the frame 10) so that the upper surface of the frame 10 is substantially co-planer with the uppermost surface of the material on mold half 26. Longitudinally and laterally spaced upstanding locating pins 30 are provided on the lower mold half 26 which are received in the appropriate locater holes 22 of the lead frame 10 to facilitate the placement and alignment of the lead frame 10 in the cavity 28.

Figure 3:
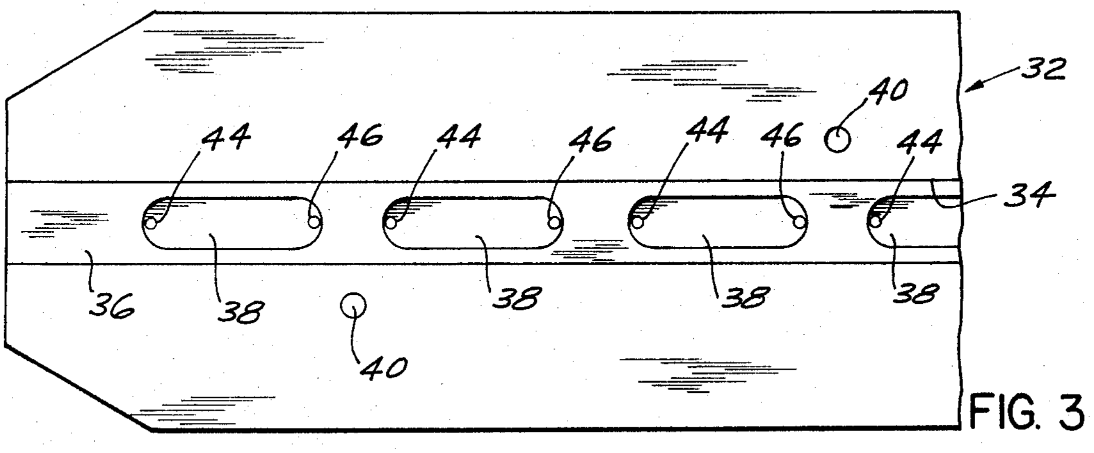
FIG. 3 is a bottom plan view of a portion of the top section of the preencapsulating mold.
Figure 4:
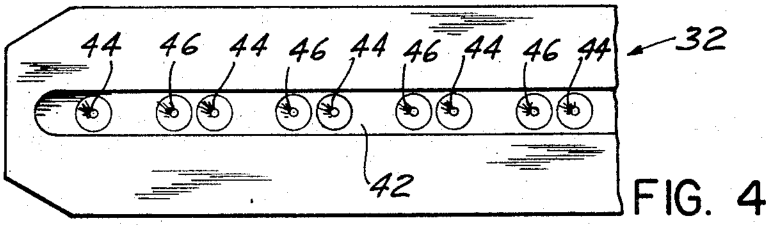
FIG. 4 is a top plan view thereof.

The upper mold half 32 is shown in FIGS. 3 and 4. The lower surface thereof is provided with a substantially centrally located open-ended slot 34 which receives a strip of heat-resistant material 36 therein such as the aforementioned rubber compound. Alternatively, the entire lower surface may be covered with such compound. The strip 36 is provided with laterally spaced elongated elliptical recesses 38 which are sized and positioned to receive each respective set of three toroids 24 (associated with each set of leads 12) therein when the mold is assembled. The mold half 32 is provided with laterally and longitudinally spaced locator holes 40 which receive the pins 30 therein to position and align the mold half 32 on the mold half 26.

The top surface of the mold half 32 is provided with a centrally located elongated channel 42 having pairs of countersunk holes 44, 46 therein. Each pair of holes 44, 46 is associated with a different one of the recesses 38 in the strip 34. That is, each hole 44 extends through the upper mold half 32 and is positioned adjacent one end of the recesses 38. Similarly, each hole 46 extends through the mold half 32 and communicates with a respective recess 38 adjacent the other end thereof Each pair of holes 44, 46 provides means for the respective introduction of preencapsulation compound and for the venting of air, as noted in detail below.

Figure 5:
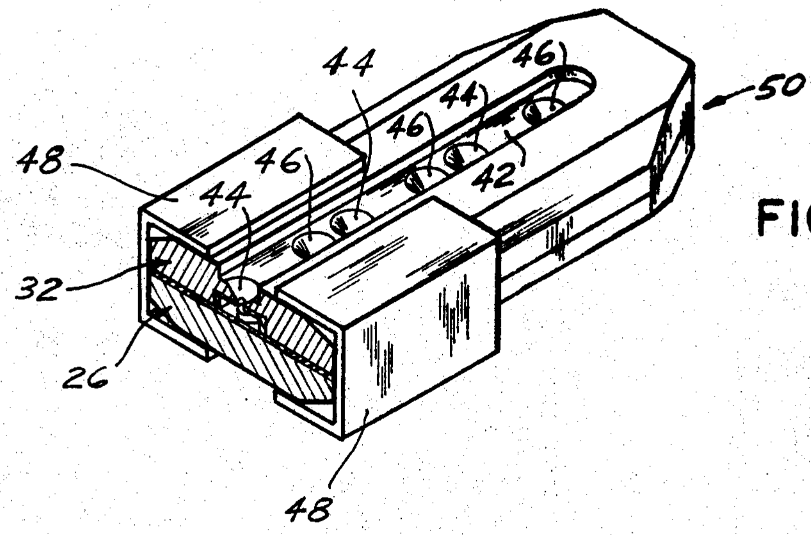
FIG. 5 is a perspective view of the assembled mold sections shown in FIGS. 3 and 4.

In assembling the mold halves to form a complete mold 50, as shown in FIG. 5, the lead frame 10 with the elements 24 connected thereto is placed on the lower mold half 26 with the locator pins 30 received in the appropriate holes 22. The frame is then moved downwardly on the pins 30 until it seats in the cavity 28. The upper mold half 32 is then positioned on the lower mold half 26 so that the locator pins 30 are received in the holes 40 to provide the mold 50.

Spring C-clamps 48 are then placed along the longitudinal edges of the mold 50 with the legs of the clamps engaging the upper and lower surfaces of the mold 50 to maintain the mold in its assembled condition during preencapsulation of the elements. The C-clamps 48 may be applied to the mold by aligning the C-clamps on either side of the mold, placing the mold with the aligned C-clamps in a vise and tightening the vise to draw the jaws together and force the legs of the clamps to spread slightly and slide over the upper and lower surfaces of the mold.

The assembled mold 50 may then be placed in an oven to preheat the same to reduce the formation of gas bubbles in the preencapsulating compound during curing since gas bubbles produce uneven pressure variations on the ferrite elements.

The preencapsulating compound has the characteristics of being initially liquid and solidifying after curing (heating and subsequent cooling). Additionally, the compound should be substantially free of gases and be resilient and able to distribute pressures substantially equally in all directions after curing. One such compound having these properties is a degased polyurethane elastomer. Thus, the polyurethane elastomer is degased by placing a quantity of the same in an evacuation chamber and subjecting the compound to a vacuum until the absorbed gases have been removed.

The compound is then loaded into an injection apparatus and injected into the mold. More specifically, the preencapsulating compound may be loaded into a syringe having a needle or nozzle which is sized to be received in the holes 44. The mold 50 is removed from the oven and the nozzles are inserted into the appropriate holes 44 and the compound is injected into each of the cavities 38. The preencapsulating compound will therefor flow over the toroids 24 in each set of toroids and out of the vent holes 46 along the overflow channel 42.

After injection, the preencapsulating compound is cured by placing the mold in an oven and heating the mold to a preselected temperature for a predetermined time in accordance with the requirements of the type of material used. In practice, the mold is heated in a conveyor oven. After heating the mold is permitted to cool to room temperature.

The overflow compound and the compound filling the holes 44 and 46 is easily removed by grasping an end of the now solidified material in the channel 42 and pulling the same away from the mold. Since the holes 44 and 46 are countersunk, the material filling the holes will normally break at its thinest point, which is at the point of connection of the compound in the holes and the block of preencapsulating material covering the toroids, to facilitate the easy removal of this overflow.

After removal of the overflow, the C-clamps 48 are removed and the mold 50 is opened. The lead frame 10 is removed from the cavity 28. If any flash is present it may be removed at this time. Thus, each set of toroids 24 associated with each set of leads 12 will be embedded in a block 52 of resilient preencapsulating compound (FIG. 6) which, as noted above, is substantially free of gases to eliminate unequal forces on the ferrite elements and serves to distribute and equalize pressures applied thereto.

To encapsulate or form a casing around blocks 52 they are coated with a plastic encapsulating material, which may be either thermoplastic or thermosetting, utilizing conventional transfer molding techniques. Thus, the ferrite elements of the illustrative example will be encapsulated, sealed, or embedded within the plastic covering to protect the elements from moisture and rough handling and other adverse ambient conditions. Moreover, the unequal pressures or forces which may arise in the encapsulating material will be absorbed or distributed by the preencapsulation material to substantially eliminate changes in the electrical characteristics of the elements.

Figures 6, 7, 8:
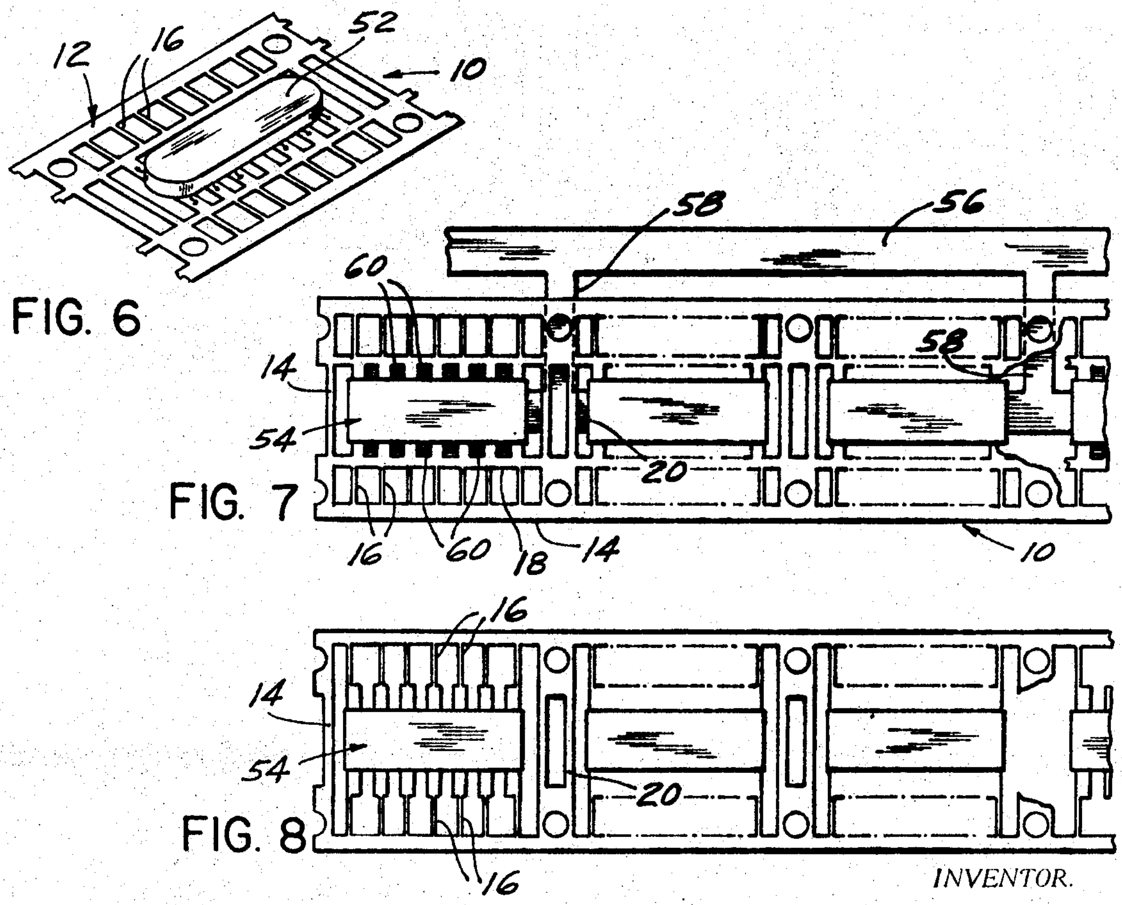
FIG. 6 is a perspective view of the lead frame of FIG. 1 having the preencapsulated elements thereof.
FIG. 7 is a top plan view of the interconnected encapsulated components.
FIG. 8 is a top plan view similar to FIG. 7, with the tie bars removed.

FIG. 7 illustrates the lead frame 10 with the encapsulated components 54 carried thereby as it appears after removal from the transfer mold. Accordingly, a gate 56 and runners 58 are connected to the components as well as flash 60, all of which are formed by the encapsulating material.

The runners 58, gate 56 and the flash 60 are removed by conventional means such as by hand or by operation of an appropriate punch.

At this point the casing of the components 54 may be stamped with an appropriate model number or the manufacturer's name or the like.

If the lead frame 10 is provided with tie bars 18, the bars may be removed to leave the lead frame as shown in FIG. 8. The tie bars 18 may be removed in a manner similarly to the removal of the gates and runners, i.e., by hand or automatically by a punch or the like.

Figure 9:
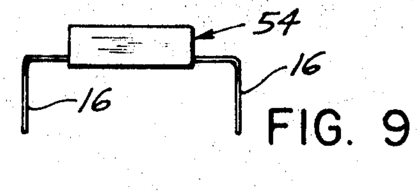
FIG. 9 is a side elevational view of an electrical component constructed according to the present invention.

Thereafter, the lead mounting portion 14 and the spacer bars 20 are removed, either by hand or by a punch or the like, to separate the individual components. If desired, the leads 16 thereafter may be bent at a 90° angle, as shown in FIG. 9, to facilitate later handling of the component.

Accordingly, an electrical component and a method of fabricating the same has been disclosed which produces a component having an encapsulated element which is not effected by the encapsulation process.

While a preferred embodiment and method have been disclosed herein it will be obvious that many ommissions, changes and additions may be made in such embodiment and method without departing from the spirit and scope of the present invention.

What is claimed is:

1. A method of fabricating electrical components comprising forming a lead frame having a plurality of spaced sets of leads, connecting at least one electrical element to selected sets of leads, preencapsulating said elements to surround the element associated with each set of leads with a continuous material which is substantially free of gas and which substantially evenly distributes pressures applied, encapsulating said preencapsulated elements, and separating said encapsulated elements to provide said electrical components.

2. The method of Claim 1, in which said preencapsulating step comprises coating said elements with a preencapsulating liquid, and curing said liquid to provide said preencapsulated elements.

3. The method of claim 2, including the step of degassing said preencapsulating liquid prior to coating said elements with said liquid.

4. The method of claim 3, further comprising the steps of placing said lead frame with said connected electrical elements in a mold, introducing said preencapsulating liquid into said mold to coat said elements, and curing said preencapsulating liquid by heating said mold to a preselected temperature, and cooling said mold.

5. The method of claim 4, including the step of preheating said mold to a predetermined temperature prior to introducing said preencapsulating liquid therein.

6. The method of claim 1, in which said elements are connected to said plurality of selected sets of leads by respective resistance welds.

7. The method of claim 1 in which said lead frame is formed with tie bars interconnecting said leads and a lead mounting portion, and including the further step of removing said tie bars and lead mounting portion from each of said electrical components, and bending the leads of each component, and bending the leads of each component at a preselected angle.

8. The method of claim 1, in which said elements are encapsulated by transfer molding the same.

9. An electrical component comprising a plurality of leads, an electrical element connected to said plurality of leads, a pressure-distributing material surrounding said element, and a casing surrounding said pressure-distributing material having said element embedded therein.

10. An electrical component as in claim 9, in which said pressure-distributing material comprises a polyurethane elastomeric material.

11. An electrical component as in claim 9, in which said casing comprises a thermoplastic material.

12. An electrical component as in claim 9, in which said casing comprises a thermosetting material.

* * * * *